United States Patent [19]

Vreeland et al.

[11] Patent Number: 5,571,457
[45] Date of Patent: Nov. 5, 1996

[54] BIASABLE TRANSFER COMPOSITIONS AND MEMBERS HAVING EXTENDED ELECTRICAL LIFE

[75] Inventors: William B. Vreeland, Webster; John C. Wilson; Mark C. Zaretsky, both of Rochester, all of N.Y.

[73] Assignee: Eastman Kodak Company, Rochester, N.Y.

[21] Appl. No.: 298,914

[22] Filed: Aug. 31, 1994

[51] Int. Cl.$^6$ .............................. H01B 1/12; H01B 1/20; G03G 13/00; G03G 15/00
[52] U.S. Cl. ........................... 252/519; 430/31; 430/902; 428/425.9; 428/423.1; 428/411.1; 427/126.1; 399/313
[58] Field of Search .................. 252/519; 558/44, 558/58, 48; 430/65, 126, 31, 902; 355/274, 275; 528/59, 60, 61, 62, 63, 64, 65, 66, 67, 68, 69, 70, 71, 72; 428/425.9, 423.1, 411.1; 427/126.1

[56] References Cited

U.S. PATENT DOCUMENTS

| | | | |
|---|---|---|---|
| 3,730,953 | 5/1973 | Naito et al. | 528/69 X |
| 3,892,715 | 7/1975 | Bonin et al. | 528/72 X |
| 3,915,923 | 10/1975 | Ward | 528/65 X |
| 4,729,925 | 3/1988 | Chen et al. | 428/425.8 |
| 4,762,941 | 8/1988 | Chen et al. | 588/44 |
| 5,011,739 | 4/1991 | Nielsen et al. | 355/274 X |
| 5,122,303 | 6/1992 | Tieke | 252/519 X |
| 5,212,032 | 5/1993 | Wilson et al. | 430/65 |

FOREIGN PATENT DOCUMENTS

| | | |
|---|---|---|
| 3324768 | 1/1985 | Germany . |
| 3007768 | 1/1991 | Japan . |

*Primary Examiner*—Douglas J. McGinty
*Attorney, Agent, or Firm*—Willard G. Montgomery; J. Jeffrey Hawley; Anne B. Kiernan

[57] ABSTRACT

An electrically conductive or semi-conductive polymeric material which includes a blend of:

(i) a bis[oxydiethylenebis(polycaprolactone)yl]sulfoaryldicarboxylate or a bis[oxydiethylenebis(polycaprolactone)yl]sulfonamidosulfonylaryldicarboxylate, and (ii) a complex of a ferric halide and ethylene glycol or an oligoethylene glycol selected from di-, tri-, or tetraethylene glycol, to provide the material with its conductive properties.

The material has a resistivity of from about $10^6$ to about $5 \times 10^{11}$ ohm cm and can be used in the fabrication of biasable transfer members such as, for example, a biasable transfer roll to transfer electrostatographic toner images from a photoconductor to a final support material such as a sheet of paper wherein the member electrically cooperates with the photoconductor to establish a directional force field therebetween.

30 Claims, 1 Drawing Sheet

FIG. 1

BIASABLE TRANSFER COMPOSITIONS AND MEMBERS HAVING EXTENDED ELECTRICAL LIFE

FIELD OF THE INVENTION

This invention relates generally to the field of polymers and particularly to polymers which are electrically conductive or semi-conductive having an improved or extended electrical life.

BACKGROUND OF THE INVENTION

In the past, polymers, particularly urethane rubber, have been used for a variety of applications in which it is desirable that the product have some electrical conductivity.

One example involves biasable transfer members, e.g., biasable transfer rolls or webs, which are used in electrostatographic copying systems or apparatus to transfer toner images from an electrostatographic element, such as a photoconductor, to a final support material or receiver, such as a web or sheet of paper.

In electrostatography, an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with charged toner particles. If desired, the toner image can then be transferred to a final support material or receiver such as a web or sheet of paper and affixed thereto to form a permanent record of the original.

The process of transferring toner material from the electrostatographic element or photoconductor to the receiving sheet or copy sheet, is realized at a transfer station. In a conventional transfer station, transfer is commonly achieved by applying electrostatic force fields in a transfer nip sufficient to overcome the forces which hold the toner particles to their original support surface on the photo-receptive member or photoconductor. These electrostatic force fields operate to attract and transfer the toner particles over and onto the copy sheet or other supporting second surface.

As a means of controlling the forces acting on the toner during transfer so that transfer of the toner image from the photoconductor to the final support material occurs, a biasable transfer member, such as a biasable transfer roll is utilized.

For example, Chen et al, in U.S. Pat. Nos. 4,729,925 and 4,742,941 disclose, as coating materials for biasable transfer members, polyurethane elastomers made from certain polyisocyante prepolymers and polyols in which the resistivity can be maintained between $1.0\times10^9$ and $1.0\times10^{11}$ ohm cm by copolymerizing with the polyisocyanate prepolymers and polyol hardening compounds used to make the polyurethane elastomers certain polyol charge control agents formed from certain carboxylated aromatic sulfonate salts which have been esterified with polyester diols or certain carboxylated aromatic sulfonamidosulfonyl salts esterified with polyester diols as represented by formulas (I) and (II):

wherein $R^1$ represents:

$R^6$ represents sulfonate, oxyphenylene sulfonate, oxycyclohexylene sulfonate or p-toluenesulfonamidosulfonyl;

$R^2$ represents oxyphenylene sulfonate, oxycyclohexylene sulfonate, or p-toluenesulfonamidosulfonyl;

$R^7$ represents:

$R^3$ represents a straight or branched chain alkylene group having 2 to 7 carbon atoms;

$R^4$ is the same as $R^3$ or is $-(R^5-O)_x R^5$;

$R^5$ is the same as $R^3$;

m and n in formula (I) are integers which together are of sufficient value to achieve an $R^1$ molecular weight of 300 to 30,000;

m and n in formula (II) are integers which together are of sufficient value to achieve an $R^7$ molecular weight of 300 to 30,000; and M represents hydrogen, an alkali metal, ammonium or $P^+(C_6H_5)_3CH_3$.

Further, Wilson, et al, in U.S. Pat. No. 5,212,032, disclose, as coating materials for biasable transfer members, certain elastomeric polyurethanes containing, as conductivity control agents or charge control agents for controlling the resistivity of the elastomeric coating and hence that of the biasable transfer member to a range from about $10^7$ to about $5\times10^{10}$ ohm cm, certain ionizable ferric halides selected from the group consisting of ferric fluoride, ferric chloride and ferric bromide complexed with ethylene glycol or an oligoethylene glycol selected from the group consisting of di-, tri-, and tetraethylene glycol.

In general, it has been found that for optimal toner image transfer to take place, that is, where all, or substantially all of the toner particles transfer from the surface of the photoconductor to the final support surface, that the polyurethane coating materials should possess a resistivity (i.e., a volume resistivity) of from about $10^6$ to about $5.0\times10^{11}$ ohm cm. Volume resistivity, as defined herein, is the product of the applied voltage and the electrode surface area divided by the product of the sample thickness and the measured current. That is:

$$\rho = \frac{(V)(e.s.a.)}{(i)(t)}$$

where $\rho$=volume resistivity;
V=applied voltage;
e.s.a.=electrode surface area,
i=measured current, and
t=sample thickness.

However, although the polyurethane materials of Chen et al and Wilson et al possess volume resistivities in a range compatible with or critical to optimal toner image transfer, they are deficient in that they both exhibit or possess relatively short electrical lives. That is, typically after about forty-eight hours of continuous use in an electrostatographic copying device, a biasable transfer member utilizing a polyurethane material of either Chen, et al or Wilson, et al must be removed from the copying device or machine and replaced with a new biasable transfer member because the original biasable transfer member no longer is capable of transferring a complete toner image from the photoconductor to the final support material (e.g. a sheet of paper). This is believed to be due to the following phenomena. Under normal operating conditions, it is necessary in order to achieve optimal image transfer to maintain a relatively constant current flow of less than about 30 micro amps in the nip area between the transfer roll surface, the transfer material and the photoconductive surface from which a developed image is to be transferred. For this condition to exist, the resistivity of the polyurethane material must be within critical values, i.e., from about $10^6$ to about $5.0 \times 10^{11}$ ohm cm, as previously mentioned, and must be relatively constant under normally anticipated extremes of operating conditions. The electrical life, and hence the functional life of the biasable transfer member (i.e., the working life of the biasable transfer member) is directly related to the maintenance of this constant controlled resistivity region. That is, the electrical life of the biasable transfer member is largely determined by the stability of the output current and/or voltage versus time. (Bias roll power supplies are generally constant current or constant voltage devices with upper current or voltage limits which respond to changes in the resistivity of the biasable roll material, i.e., the polyurethane). Thus, as used herein, the term "electrical life" refers to a controlled, i.e., constant resistivity with time under an applied electrical field. Changes in the resistivity of the polyurethane material versus time are reflected in voltage demands required to maintain the constant current output of the material of which the device is made. As transfer current flows through the biased transfer member or roll, however, over time the ionic charge control or conductivity control additives in the polyurethane materials used in the biasable transfer roll migrate depleting ions and increasing the resistivity of the material causing the bias voltage to increase while maintaining a constant transfer current. Eventually, substantially all of the ions are depleted and the upper voltage limit is reached beyond which point the efficient transfer of toner can no longer take place resulting in incomplete toner transfer causing undesirable side effects such as mottle or no toner transfer at all. Thus, the material used in the fabrication of a typical biasable transfer member (e.g., a biasable transfer roll) has an intrinsic electrical life directly related to the ionic depletion of the conductivity control agent in the polyurethane material. Stated another way, the problem associated with bias roll transfer systems is that the electrical life of the bias transfer member is inversely proportional to the transfer current therethrough.

We have found, however, that by blending a dicarboxylate salt of Chen et al with a ferric halide/ethylene glycol or oligoethylene glycol complex of Wilson et al in a molar ratio of dicarboxylate salt to complex of 1.0:5.0 to 5.0:1.0 and incorporating the blend into a polymeric material such as a polyurethane material, that the blend not only provides a resistivity to the polymeric material of from about $10^6$ to about $5.0 \times 10^{11}$ ohm cm, which is consistent with optimal toner image transfer but, in addition, improves or extends the electrical life and hence the functional life of the polyurethane material beyond the electrical life and the functional life of either of the polyurethane materials of Chen et al or Wilson et al.

Further, in addition to controlling the resistivity of the polyurethane material and extending or improving the electrical life thereof, it also has been found that incorporation of a blend of these particular materials in the amounts disclosed into a polyurethane material reduces the sensitivity of the resistivity of the material to changes in relative humidity.

The terms "biasable transfer member," "biased transfer member" or "bias transfer member," as used herein, refer to a member for electrically cooperating with a conductive support surface to attract electrically charged particles from the support surface towards the member.

SUMMARY OF THE INVENTION

Thus, in one aspect of the present invention there is provided, as a new composition of matter, an electrically conductive or semi-conductive polymeric material comprising a polymeric material having incorporated therein to provide the polymeric material with a resistivity of from about $10^6$ to about $5.0 \times 10^{11}$ ohm cm, a blend of:

(i) a bis[oxydiethylenebis(polycaprolactone)yl]sulfoaryldicarboxylate or a bis[oxydiethylenebis(polycaprolactone)yl]sulfoamidosulfonylaryldicarboxylate, as represented by formula (I) or formula (II):

wherein $R^1$ represents:

$R^6$ represents sulfonate, oxyphenylene sulfonate, oxycyclohexylene sulfonate or p-toluenesulfonamidosulfonyl;

$R^2$ represents oxyphenylene sulfonate, oxycyclohexylene sulfonate, or p-toluenesulfonamidosulfonyl; $R^7$ represents:

$R^3$ represents a straight or branched chain alkylene group having 2 to 7 carbon atoms; $R^4$ is the same as $R^3$ or is $-(R^5-O)_x R^5$; $R^5$ is the same as $R^3$;

m and n in formula (I) are integers which together are of sufficient value to achieve an $R^1$ molecular weight of 300 to 30,000; m and n in formula (II) are integers which together are of sufficient value to achieve an $R^7$ molecular weight of 300 to 30,000; and M represents hydrogen, an alkali metal, ammonium or $P^+(C_6H_5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0.

In another aspect of the present invention, there is provided a biasable transfer member, that is a member capable of electrically cooperating with a conductive support surface to attract charged toner particles from the support surface towards the member, which comprises a conductive substrate for supporting a uniform potential thereon and at least one coating which comprises a polymeric material having incorporated therein in an amount sufficient to provide the polymeric material with a resistivity of from about $10^6$ to about $5.0 \times 10^{11}$ ohm cm, a blend of:

(i) a bis[oxydiethylenebis(polycaprolactone)yl]sulfoaryldicarboxylate or a bis[oxydiethylenebis(polycaprolactone)yl]sulfonamidosulfonylaryldicarboxylate, as represented by formula (I) or formula (II):

(I)

(II)

wherein $R^1$ represents:

$R^6$ represents sulfonate, oxyphenylene sulfonate, oxycyclohexylene sulfonate or p-toluenesulfonamidosulfonyl; $R^2$ represents oxyphenylene sulfonate, oxycyclohexylene sulfonate, or p-toluenesulfonamidosulfonyl; $R^7$ represents:

$R^3$ represents a straight or branched chain alkylene group having 2 to 7 carbon atoms; $R^4$ is the same as $R^3$ or is $-(R^5-O)_x R^5$; $R^5$ is the same as $R^3$; m and n in formula (I) are integers which together are of sufficient value to achieve an $R^1$ molecular weight of 300 to 30,000; m and n in formula (II) are integers which together are of sufficient value to achieve an $R^7$ molecular weight of 300 to 30,000; and M represents hydrogen, an alkali metal, ammonium or $P^+(C_6H_5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0, the coating being in electrical contact with the conductive substrate such that the coating is capable of transmitting a bias potential from the substrate to the outer periphery of the coating.

In a still further aspect of the present invention, there is provided a method of making an electrically conductive or semi-conductive polymeric material having a resistivity of from about $10^6$ to about $5.0 \times 10^{11}$ ohm cm, the method comprising the steps of mixing a blend of:

(i) a bis[oxydiethylenebis(polycaprolactone)yl]sulfoaryldicarboxylate or a bis[oxydiethylenebis(polycaprolactone)yl]sulfoamidosulfonylaryldicarboxylate, as represented by formula (I) or formula (II):

(I)

(II)

wherein $R^1$ represents:

$R^6$ represents sulfonate, oxyphenylene sulfonate, oxycyclohexylene sulfonate or p-toluenesulfonamidosulfonyl; $R^2$ represents oxyphenylene sulfonate, oxycyclohexylene sulfonate, or p-toluenesulfonamidosulfonyl; $R^7$ represents:

$R^3$ represents a straight or branched chain alkylene group having 2 to 7 carbon atoms; $R^4$ is the same as $R^3$ or is $-(R^5-O)_x-R^5$; $R^5$ is the same as $R^3$;

m and n in formula (I) are integers which together are of sufficient value to achieve an $R^1$ molecular weight of 300 to 30,000; m and n in formula (II) are integers which together are of sufficient value to achieve an $R^7$ molecular weight of 300 to 30,000; and M represents hydrogen, an alkali metal, ammonium or $P^+(C_6H_5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0 with a polymer or a polymer precursor to provide a solution that includes said blend and said polymer or polymer precursor; curing the solution to provide a polymeric material or a polymeric material produced from said polymer precursor having incorporated therein said blend of said dicarboxylate and said complex; the quantity of said blend relative to said polymer or said polymer precursor being chosen so that the resistivity of the resultant polymeric material is from about $10^6$ to about $5.0 \times 10^{11}$ ohm cm.

Important advantages of the polymeric materials of the present invention are that they possess the capability to retain pre-established levels of resistivity, exhibit extended electrical life and reduced moisture sensitivity.

DESCRIPTION OF THE PREFERRED EMBODIMENTS

As previously mentioned, the complexes which are used in combination with the aforedescribed dicarboxylate salts to form the additive blends of the present invention which are incorporated into a polymeric material to provide the material with a resistivity of from about $10^6$ to about $5.0 \times 10^{11}$ ohm cm, to extend the electrical life thereof and to reduce the sensitivity of the resistivity of the material to changes in relative humidity are comprised of ethylene glycol or a low molecular weight oligoethylene glycol, specifically diethylene glycol, triethylene glycol or tetraethylene glycol complexed with an ionizable ferric halide selected from the group consisting of ferric fluoride, ferric chloride or ferric bromide.

Such complexes are readily prepared by dissolving an ionizable ferric halide, such as ferric chloride, and ethylene glycol or a low molecular weight oligoethyleneglycol, specifically diethylene glycol, triethylene glycol or tetraethylene glycol in a suitable solvent, such as methanol, and subsequently evaporating the solvent to form a complex of the ferric halide with the ethylene glycol or the low molecular weight oligoethylene glycol.

The dicarboxylates which are used in the blends of the present invention, are represented by formulas (I) and (II) below:

wherein $R^1$ represents:

$R^6$ represents sulfonate, oxyphenylene sulfonate, oxycyclohexylene sulfonate or p-toluenesulfonamidosulfonyl;

$R^2$ represents oxyphenylene sulfonate, oxycyclohexylene sulfonate, or p-toluenesulfonamidosulfonyl;

$R^7$ represents:

$R^3$ represents a straight or branched chain alkylene group having 2 to 7 carbon atoms;

$R^4$ is the same as $R^3$ or is $-(R^5-O)_x-R^5$;

$R^5$ is the same as $R^3$;

m and n in formula (I) are integers which together are of sufficient value to achieve an $R^1$ molecular weight of 300 to 30,000;

m and n in formula (II) are integers which together are of sufficient value to achieve an $R^7$ molecular weight of 300 to 30,000; and M represents hydrogen, an alkali metal, ammonium or $P^+(C_6H^5)_3CH_3$.

The electrically conductive or semiconductive polymeric material has a resistivity of from about $10^6$ to about $5 \times 10^{11}$ ohm cm. The additive blend is incorporated into the polymeric material which is what provides the material with its conductive properties. Depending on the desired resistivity, the quantity of the additive blend in the material can be varied, although preferably the material includes only a small amount (i.e., from about 0.001 to about 5.0 weight percent of the blend based on the total weight of the polymeric material). Because only a small amount of the additive blend is included in the material, the material has good mechanical and thermal properties. Those properties, coupled with the conductive nature of the material, makes the material suitable for use as coating material in the fabrication of biasable transfer members used in electrostatographic developing processes, copiers and printers.

Preferred polymers contain, e.g., carbon, hydrogen, nitrogen, oxygen, sulfur or halide atoms. The most preferred polymers include elastomeric polymers such as polyurethanes and rubbers, adhesive polymers and plastics. When rubbers are used, it is desirable to include a plasticizer in the material.

While many of the electrically conductive or semi-conductive polymeric materials of the invention are particularly suitable for use in biasable transfer members, especially the electrically conductive or semi-conductive polyurethane materials previously discussed, the conductive or semi-conductive polymeric materials of the present invention also are suitable for use in a variety of other industrial applications to control surface charge and to provide extended electrical life. For example, the polymers can be used to coat the belts, shafts, wheels, inserters and paper handling rollers in paper printers. The polymeric materials of the present invention also can be used to coat car bodies, print circuits, seals and to dissipate charges in various other electrical applications, such as coatings on belts that are used to transport semiconductor wafers during manufacture. Further, conductive plastic materials, can be used to coat disc drives, machine body parts, cabinets and carrying cases.

The invention also features a method of preparing these polymeric materials. Generally, the method includes making a homogenous mixture of the additive blend in a polymer or polymer precursor and curing the composition. When the polymer precursor is an isocyanate functional prepolymer, the solution also includes an extender (polyol or polyamine) that reacts with the isocyanate groups during curing to form a polyurethane or poly(urea/urethane) resin. This method results in an even distribution of the additive blend throughout the polymeric material, which provides the material with uniform conductivity throughout. Of course, other standard ingredients, such as cure accelerators or flame retardants, may be included in the mixture.

For example, a resilient, elastomeric polyurethane elastomer can be formed by reacting (a) a polyisocyanate prepolymer formed from an isocyanate (specifically, a saturated aliphatic polyisocyanate compound, a saturated cycloaliphatic polyisocyanate compound, or an aromatic polyisocyanate compound) reacted with a polyol free of aliphatic unsaturation, and (b) a hardener composition comprising a polyol or a diamine free of aliphatic unsaturation, or a mixture thereof and an amount of an additive blend of the present invention described hereinabove sufficient to provide the polyurethane elastomer with a resistivity of from about $10^6$ to about $5.0 \times 10^{11}$ ohm cm, and more preferably, from about $2.0 \times 10^8$ to about $2.0 \times 10^{10}$ ohm cm, and to extend the electrical life thereof. The polyurethane elastomers can be crosslinked or non-crosslinked. If a crosslinked polyurethane is desired, such an elastomer can readily be formed by using an excess of polyisocyanate compound in preparing the elastomer or by utilizing a polyisocyanate, a polyol and/or a polyamine having a functionality greater than two in preparing the elastomer.

The polyisocyanate prepolymer can comprise recurring units derived from any suitable polyol with the proviso that the polyol is free of aliphatic unsaturation, including, for example, amine-based polyols, polyether polyols, polyester polyols, mixtures thereof, and aromatic as well as saturated aliphatic and saturated cycloaliphatic polyisocyanates provided they do not adversely affect or in any way interfere with the relative humidity sensitivity of the polyurethane material or alter the resistivity of the polyurethane material such that the resistivity of the material is outside the desired range of from $10^6$ to $5.0 \times 10^{11}$ ohm cm. Exemplary polyisocyanate compounds which may be used to make the prepolymer are exemplified by those disclosed in U.S. Pat. Nos. 2,969,386 and 4,476,292, such as 4,4'-methylenediphenylene diisocyanate; 1,5-naphthalene diisocyanate; 3-isocyanatomethyl-3,5,5-trimethylcyclohexyl isocyanate (isophorone diisocyanate); methylenebis(4-isocyanatocyclohexane); hexamethylene diisocyanate; 1,3-cyclohexanebis(methylisocyanate); 2,2,4-trimethylhexamethylene diisocyanate, toluene diisocyanate and combinations thereof as well as related saturated aliphatic, saturated cycloaliphatic and aromatic polyisocyanates which may be substituted with other organic or inorganic groups that do not adversely affect the course of the polymerization reaction or interfere with the relative humidity sensitivity or with the resistivity of the polyurethane in general.

The term "aliphatic", as used herein includes those carbon chains which are substantially non-aromatic in nature. They must be saturated; however, they may be unbranched, branched or cyclic in configuration and may contain various substituents. Exemplary of long chain aliphatic polyisocyanates are dodecane diisocyanate, tridecane diisocyanate, and the like.

The term "aromatic" as used herein, includes a diatropic moiety derived from benzene, naphthalene, anthracene, phenanthrene, biphenyl and the like. They may be unsubstituted or substituted, for example, with halo, nitro, saturated alkyl, saturated alkoxy, saturated alkylthio or aryl substituents. Included in this definition also are alkylenediarylene structures, for example, methylenediphenylene and ethylenediphenylene. Exemplary of aromatic diisocyanates are toluene-2,4-diisocyanate, m-phenylene diisocyanate, methylene-di-p-phenylene diisocyanate and the like.

Polyols useful in preparing the polyisocyanate prepolymer and finished polyurethane elastomers are, as previously described, any suitable polyol free of aliphatic unsaturation which will not adversely interfere with the relative humidity sensitivity of the polyurethane compositions, the resistivity of the polyurethane compositions, the electrical life of the polyurethane compositions or otherwise adversely affect the properties and/or the performance of the polyurethane elastomers in effecting optimal image transfer of the biasable member on which the polyurethane is coated and can include, for example, amine-based polyols, polyether polyols, polyester polyols and mixtures thereof. Examples of such polyols are disclosed in U.S. Pat. Nos. 2,969,386; 3,455,855; 4,476,292 and 4,390,679. One preferred group of polyols are aliphatic polyols and glycols such as trimethylolpropane, 1,3-butylene glycol, 1,4-butylene glycol, propylene glycol, polyethers such as poly(tetramethylene glycols) and poly(propylene glycols), low molecular weight polyester polyols, such as polyethylene adipate, and a poly(caprolactone)diol.

A particularly useful polyol which can be used to prepare the polyisocyanate prepolymer and/or chain extend the prepolymer to the final conductive bulk polyurethane is an alkylene glycol polymer having an alkylene unit composed of at least two carbon atoms, preferably 2 to 8 carbon atoms. These alkylene glycol polymers are exemplified by poly(ethylene glycol), poly(propylene glycol) and poly(tetramethylene glycol). Di-, tri-, and tetrafunctional compounds are available with the trifunctional ones being exemplified by the reaction product of glycerol or trimethylolpropane and propylene oxide. A typical polyether polyol is available from Union Carbide under the designation PPG-425. Also, another polyether polyol suitable for use in preparing the polyurethane materials of the present invention is a trimethylolpropane based polyfunctional polyol available from Dow Chemical Company as Voranol™

Another group of polyols are amine-based polyols. A wide variety of aromatic and aliphatic diamines may form part of the amine-based polyols. Such polyols include N,N, N'N'-tetrakis(2-hydroxypropyl)ethylenediamine and a polymer of ethylene diamine, propylene oxide and ethylene oxide. A typical aromatic amine-based polyol is available from Upjohn under the designation ISO-NOL 100; a typical aliphatic amine-based polyol is available from BASF under the designation QUADROL and a typical ethylene diamine/propylene oxide/ethylene oxide polymer is available from BASF under the designation PLURACOL 355.

In general, suitable polyols useful for preparing the prepolymer and/or chain extending the prepolymer to the final conductive bulk polyurethane will have molecular weights of from about 60 to 10,000, typically, from about 500 to 3,000.

Preferred concentration ranges for the respective components of the prepolymer are 5–40% by weight of polyisocyanate and 60–95% by weight polyol, based on the total weight of the prepolymer, to form a resin prepolymer.

The final conductive bulk polyurethane elastomer is produced by chain extending and/or crosslinking the prepolymer with a hardener composition comprising at least one additional polyol or blends of polyols of the type aforedescribed and discussed hereinabove having added thereto an additive blend of the invention described hereinbefore to control the resistivity of the polyurethane product to within the desired range.

The polyol hardener system comprises at least one polyol of the type aforedescribed, such as, for example, an amine-based polyol or a polyether polyol previously identified and defined hereinabove or blends of these polyols.

Preferred polyols are poly(tetramethylene glycol) and a trimethylolpropane based polyfunctional polyol available from Dow Chemical Co. as Voranol™ having added thereto about 0.001 to about 5.0 weight percent, based on the total weight of the polyurethane elastomer, of an additive blend of the present invention.

Alternatively, in lieu of, or in addition to, utilizing a polyol of the type and kind described hereinabove in the hardener compositions used to form the presently described polyurethane elastomers, an aliphatic or cycloaliphatic diamine free of aliphatic unsaturation or an aromatic diamine free of aliphatic unsaturation can be used in the hardener composition provided they do not interfere with the relative humidity sensitivity of the polyurethane elastomer composition, do not produce a polyurethane elastomer with a resistivity outside the desired range of from about $10^6$ to about $5 \times 10^{11}$ ohm cm or otherwise adversely affect the properties and/or the performance of the polyurethane elastomer in effecting optimal image transfer of a biasable member employing such a polyurethane elastomer. Exemplary diamines which can be used in the hardener compositions of the present invention include 4,4'-methylenebis(o-chloroaniline), ortho-, meta-, or para- phenylenediamine, bis(4-aminocyclohexyl)methane, isophoronediamine, and the reaction products of anhydrides with such amines as described in U.S. Pat. No. 4,390,679. Especially useful diamines are 4,4'-methylenebis(o-chloroaniline), diethyltoluenediamine available commercially from Ethyl Corporation, 451 Florida Blvd., Baton Rouge, La. under the trade name Ethacure 100 and di(methylthio)-2,4-toluenediamine, also available commercially from Ethyl Corporation under the trade-name Ethacure 300.

Such diamines serve to chain extend the prepolymer to the final conductive bulk polyurethane. Suitable such diamines will typically have molecular weights ranging from about 60 to about 500, and are employed in the hardener compositions alone having added thereto from about 0.001 to about 5.0 weight percent, based on the total weight of an the polyurethane, of an additive blend of the present invention or as a blend in combination with one or more of the aforedescribed polyol components in weight ratios of polyamine to polyol ranging from 1:1 to 1:10 having added thereto from about 0.001 to about 5.0 weight percent based on the total weight of the polyurethane of an additive blend of the present invention aforedescribed.

The polyurethanes are prepared by mixing the prepolymer with the polyol hardener.

In general, if the hardener contains stoichiometric equivalents of functional groups less than that contained in the prepolymer, a crosslinked polyurethane elastomer will result. On the other hand, if the hardener contains stoichiometric equivalents of functional groups greater than or equivalent to that contained in the prepolymer, then a non-crosslinked polyurethane elastomer will result. This only applies, however, if all the components in the prepolymer and the hardener are difunctional. If any component, either in the hardener composition or in the prepolymer composition has a functionality greater than two, then the resultant polyurethane elastomer will always be crosslinked.

Instead of preparing the polyurethane elastomers of the present invention by first forming a polyisocyanate prepolymer and a hardening mixture containing an additive blend of the present invention and then reacting the two together, all of the starting materials required to form the polyurethane elastomers of the present invention may simply be added together, reacted and cured in a "one-shot" method of preparation. Or, still further, an additive blend of the present invention described hereinabove may be added to the polyol used to form the polyisocyanate prepolymer instead of the hardener and the prepolymer containing the additive blend and the hardener reacted together to form the polyurethane elastomers of the present invention.

Optional additives or addenda which may be included in the reaction mixture, either by way of inclusion in the hardener composition or simply by the addition thereof to a solution of a polyisocyanate prepolymer and a hardening mixture, may comprise, for example, ethyl acrylate-2-ethylhexyl acrylate copolymer, dimethyl siloxane copolymers and other silicones such as SAG-47 commercially available from Union Carbide Company; antioxidants, such as esters of β-(3,5-di-tert-butyl-4-hydroxyphenyl)propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris(hydroxyethyl)isocyanurate, and di(hydroxyethyl)oxalic acid diamide; UV absorbers and light stabilizers such as 2-(2'-hydroxyphenyl)benzyltriazoles and sterically hindered amines such as bis(2,2,6,6-tetramethylpiperidyl)sebacate, bis(1,2,2,6,6-pentamethylpiperidyl)sebacate, n-butyl-3,5-di-tert-butyl-4-hydroxybenzyl malonic acid, bis(1,2,2,6,6-pentamethylpiperidyl)ester, condensation product of 1-hydroxyethyl-2,2,6,6-tetramethyl-4-hydroxypiperidine and succinic acid, condensation product of N,N'-bis(2,2,6,6-tetramethylpiperidyl)hexamethylenediamine, and 4-tert-octylamino-2,6-dichloro-1,3,5-s-triazine, tris(2,2,6,6-tetramethylpiperidyl)nitrilotriacetate, tetrakis(2,2,6,6-tetramethyl-4-piperidyl)-1,2,3,4-butanetetracarbonic acid and 1,1'-(1,2-ethanediyl)-bis-3,3,5,5-tetramethylpiperazinone); plasticizers such as phthalates, adipates, glutarates, epoxidized vegetable oils, and the like; fungicides, pigments, dyes; reactive dyes; moisture scavengers; and the like.

The prepolymer-hardener mixtures prior to curing, exhibit sufficiently low viscosities to facilitate mixing, pouring and air bubble diffusion, thereby allowing for the formation of bubble free castings in the configuration of a transfer roller or belt.

Two-component polyurethane mixes of the type described above into which an additive blend of the present invention can be incorporated are commercially available. One example of such a commercially available polyurethane system, is a system sold by Winfield Industries, Inc., Buffalo, N.Y., under the trade name Winthane W643.

The degree of conductivity imparted to the polymer will vary depending primarily upon the amount of the additive blend included in the combination of starting materials and the inherent properties of the given polymer and crosslinking agent, if employed, (i.e., the degree of resistivity or conductivity the polymer would have if no additive blend were included). Any amount of a blend described herein sufficient to adjust or alter the resistivity of the elastomeric polyurethane material to within the desired limits, i.e., from about $10^6$ to about $5.0 \times 10^{11}$ ohm cm, or within the range itself, may be used in accordance with the present invention. Resistivities in this range have been found to be consistent with optimal image transfer efficiency. In general, as mentioned previously, concentrations in the range of about 0.001 to 5.0 percent by weight, based on the total weight of the elastomeric polyurethane, have been found to be appropriate for adjusting the resistivity of the polymer to within the desired limits.

As mentioned previously, the blend is simply included in the desired amount in the combination of starting materials or as a component of the hardener composition or the polyisocyante prepolymer. That is, a blend of the desired dicarboxylate salt and ferric halide complex is simply added to the polyurethane starting reactants at a molar ratio of dicarboxylate salt to complex of from 1.0:5.0 to 5.0:1.0 and at a concentration of from 0.001 to 5.0 weight percent based on the total weight of the polyurethane.

As mentioned previously, the complexes used to form the additive blends used in the present invention are comprised of ethylene glycol or a low molecular weight oligoethylene glycol, specifically diethylene glycol, triethylene glycol or tetraethylene glycol, and an ionizable ferric halide selected from the group consisting of ferric fluoride, ferric chloride and ferric bromide. Such complexes are prepared by dissolving an ionizable ferric halide, such as ferric chloride, and ethylene glycol or a low molecular weight oligoethylene glycol, specifically diethylene glycol, triethylene glycol or tetraethylene glycol, in a suitable solvent such as methanol and subsequently evaporating the solvent. The resultant material is a complex of the ferric halide with the ethylene glycol or the low molecular weight oligoethylene glycol. In practice, it is advantageous to include an excess of the oligomer in the starting mixture in order to reduce the viscosity of the proposed complex. Optionally, the complex may be prepared in the absence of a solvent.

As mentioned previously, the dicarboxylate salts used in the blends of the present invention are described in Chen et al in U.S. Pat. Nos. 4,729,925 and 4,742,941.

Specific examples of such dicarboxylate salts disclosed by Chen et al include dimethyl 5-sodiosulfo-1,3-benzene dicarboxylate, bis[oxydiethylenebis(polycaprolactone)yl]-5-sodiosulfo-1,3-benzenedicarboxylate, bis[oxydiethylenebis(polycaprolactone)yl]5-methyltriphenylphosphoniumsulfo-1,3-benzenedicarboxylate, and 5-(p-toluenesulfonamidosulfonyl)isophthalic acid, methyltriphenylphosphonium-nitrogen salt, oxydiethylenebis(polycaprolactone)ester.

Although it is not understood at the present time why the additive blends of the present invention when incorporated into a polymeric material of the type disclosed herein extend or improve the electrical life of the polymeric material, it is evident that the additive blend is able to maintain a constant transfer current passing through the polymeric material for a period of time exceeding both that of the additives of Chen et al or Wilson et al.

As mentioned previously, the additive blends used in the present invention for controlling or adjusting the resistivity of the polyurethane elastomers which are used in biasable transfer members as coating materials and which extend the electrical life of the polyurethane elastomers, also significantly reduce the sensitivity of the resistivity of the polyurethane to changes in the relative humidity.

The relative humidity sensitivities of the elastomeric polyurethanes of the present invention which are used for making biasable transfer members by coating a conductive substrate for supporting a uniform bias potential thereon with at least one coating of the elastomeric polyurethane have been obtained by measuring the volume resistivity of the polyurethanes at a relative humidity of 0 percent and a relative humidity of 100 percent. The ratio of the resistivity at a relative humidity of 0 percent to the resistivity at a relative humidity of 100 percent is the relative humidity sensitivity. This relative humidity sensitivity also is referred to as the relative humidity swing. The ratio of the sensitivity at a relative humidity of 0 percent and a relative humidity of 100 percent should be about 1 to 12 to provide a suitable biasable transfer member in accordance with the present invention. Ideally, the ratio should be 1. As mentioned above, in addition to the desirability of having a low relative humidity swing, the elastomeric polyurethanes useful for biasable transfer members must also have a resistivity of from about $10^6$ to about $5.0 \times 10^{11}$ ohm cm, and preferably from about $2.0 \times 10^8$ to about $2.0 \times 10^{10}$ ohm cm. In the event a particular elastomeric polyurethane has a resistivity higher than the desired resistivity, the resistivity may be adjusted by the inclusion of a suitable amount of an additive blend of the present invention to adjust the resistivity of the particular polymeric material as described previously.

The hardness of the electrically conductive or semiconductive elastomeric polyurethanes of the invention, when used as a coating material in a biasable transfer member, is between about 10 Shore A to about 80 Shore D, and preferably about 15–100 Shore A. The control of the hardness is within the purview of those skilled in the art and the hardness can be controlled by such parameters as by varying the types and amounts of reactants used and by using various additives such as plasticizers.

The coating can be applied to the substrate by any suitable method or technique known in the art including spraying, casting in molds, affixing sheets of the material to the substrate member by suitable mechanical means or by suitable cement, and the like.

The biasable transfer members of the present invention have application in any suitable electrostatographic device such as, for example, an electrophotographic device, in which a transfer member, more particularly, a bias transfer roll, is used for electrically cooperating with a photoconductive element, plate or surface when brought into contact therewith to attract toner particles bearing an electrostatic charge on the element or plate toward the roll. Transfer is accomplished, as in the prior art, by feeding a sheet of transfer material into the nip region formed by the surface of the transfer roll and the surface of a photoconductive insulating material or element bearing a developed image and imposing a potential on the transfer roll sufficient to cause the transfer of the toner particles or material from the surface of the photoconductive insulating material or element to the adjacent surface of the transfer material. In practice, any source of electrical power connected to the central conductive core of the transfer roll and capable of placing the transfer roll member at a potential sufficient to attract toner images from the photoconductive insulating surface toward the roll may be employed. A more complete discussion of the principles and configurations involved in bias roll transfer may be found in U.S. Pat. Nos. 2,951,443; 3,620,616; 3,633,543; 3,781,105; or 3,708,482.

Figure 1:
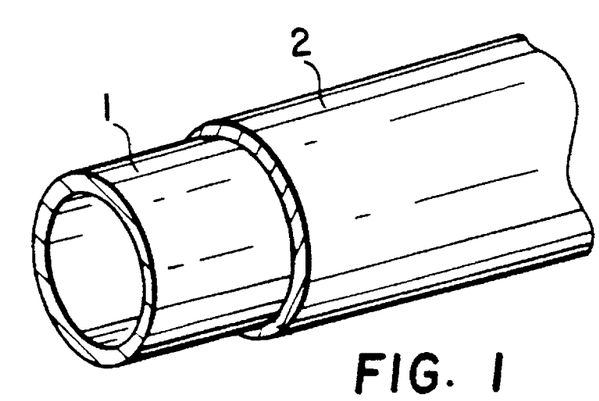
FIGURE 1 is a perspective view in partial section showing the construction of a biasable transfer roll of the present invention.

Referring specifically to FIG. 1, there is shown a cut-away view of a transfer member illustrating the internal construction thereof. The transfer member is in the form of a roll and is basically formed upon a rigid hollow cylinder 1 that is fabricated of a conductive metal, such as aluminum, copper or the like, capable of readily responding to a biasing potential placed thereon. Over core 1 is placed a coating 2 which is a crosslinked or non-crosslinked elastomeric polyurethane containing an additive blend of the present invention aforedescribed capable of altering or controlling the resistivity of the polyurethane to within a resistivity range consistent with optimal image transfer and of extending the electrical life of the polyurethane.

Outer coating 2 which is formed of the resilient, elastomeric material can be designed to have a hardness of between about 10 Shore A to about 80 Shore D, and preferably about 15–100 Shore A and may be about 0.050 inch (0.127 cm) to about 0.625 inch (1.58 cm) in thickness, preferably about 0.30 inch (0.762 cm) in thickness, having sufficient resiliency to allow the roll to deform when brought into moving contact with a photoconductive drum surface to provide an extended contact region in which the toner particles can be transferred between the contacting bodies. The elastomeric polyurethane coating should be capable of responding rapidly to the biasing potential to impart electrically the charge potential on the core to the outer extremities of the roll surface. It is preferred that the polyurethane coating have a resistivity of from about $10^6$ to about $5.0 \times 10^{11}$ ohm cm, and, more preferably, from about $2.0 \times 10^8$ to about $2.0 \times 10^{10}$ ohm cm, as this has been found to be most consistent with optimal image transfer. This is achieved by including in the polyurethane elastomer an additive blend of the present invention. As a result, a permanent, or at the very least, a relatively constant degree of resistivity is imparted to the polyurethane elastomer that will not change substantially over time during the course of normal operations and the electrical life of the polyurethane will be improved. In accordance with the present invention, the coating of the conductive substrate must be formulated of at least one layer of an elastomeric polyurethane having an additive blend of the kind or type described herein capable of altering and/or controlling the resistivity of the polyurethane to within the desired resistivity range and of extending the electrical life of the polyurethane. By coating the biasable transfer member with these particular polyurethane elastomers, the resistivity of the biasable transfer member is controlled and, in addition, the electrical life of the biasable transfer member is extended. Further, sensitivity of the resistivity of the biasable transfer member also is controlled in relationship to changes in relative humidity.

The following examples and comparative tests illustrate more clearly the elastomeric polyurethane materials of the present invention which may be used in the fabrication of the biasable transfer members as discussed above and for controlling the resistivity and extending the electrical life of the biasable transfer member, including controlling the sensitivity of the resistivity of the member to changes in relative humidity although the invention is not to be construed as limited in scope thereby.

Sample Preparation

Slabs four inches (10.16 cm) in width and six inches (15.24 cm) in length of the particular elastomeric polyurethanes to be tested were cast in a stainless steel mold to a thickness of 0.25 inch (0.635 cm). Samples of the various cast materials were placed in controlled humidity chambers for a designated number of days. One set of chambers was maintained at a relative humidity of 0 percent and another set of chambers was maintained at a relative humidity of 100 percent. A 0 percent relative humidity environment was obtained by suspending the test samples in a sealed jar containing 1-inch of anhydrous calcium sulfate at 24° C. A 100 percent relative humidity environment was obtained by suspending the samples over water in a sealed jar at 24° C. The samples were suspended in the chambers in such a way that both sides were available to the atmosphere. In this manner, the samples would have taken up very close to the equilibrium amounts of water within 14 days. After 14 days, the volume resistivities of the samples were measured according to the procedure of ASTM Standard D-257 by placing the samples between two soft electrodes of a known surface area, applying a pressure of 20 psi and supplying a 1 kilovolt DC bias from a Trek 610C Cor-A-Trol (high voltage supply) to one electrode and measuring the current from the second electrode using a Kiethly 485 Picoammeter. Values are reported in ohm cm.

The resistivities measured at both 0 percent and 100 percent relative humidity were recorded. For the designated examples below, the ratio of the resistivity at 0 percent relative humidity to the resistivity at 100 percent relative humidity was determined. The resulting ratio was designated as the RH sensitivity or RH swing and is reported as RH sensitivity in Table I below where resistivity at 0 percent and 100 percent relative humidities also is designated for the various samples tested.

EXAMPLE 1

This example describes the preparation of a crosslinked 36 Durometer Shore A hardness elastomeric polyurethane containing, as an additive blend of the present invention, a blend of bis[oxydiethylenebis(polycaprolactone)yl]- 5-methyltriphenylphosphoniumsulfo-1,3-benzenedicarboxylate and a diethylene glycol-ferric chloride complex at a molar ratio of 1:1. The molar ratio of ferric chloride to diethylene glycol in the complex was 1:3.

To a one-liter plastic beaker containing 12.64 g (142.29 meq) of a trimethylolpropane based polyfunctional polyol obtained from Dow Chemical Company as Vornol™, 1.92 g (2.50 meq) of bis[oxydiethylenebis(polycaprolactone)yl]-5-methyltriphenylphosphoniumsulfo-1,3-benzenedicarboxylate, 0.2 g (2.50 meq) of a complex of diethylene glycol and ferric chloride and two drops of a polydimethylsiloxane anti-foam agent obtained from Union Carbide Company as SAG 47™, were added 185.26 g (147.29 meq) of a polyester based polyurethane prepolymer obtained from Uniroyal Company as Vibrathane™ which analyzed as a toluene diisocyanate/adipate/polypropylene glycol prepolymer. The reaction mixture was stirred at room temperature, under nitrogen, for two minutes, degassed under reduced pressure (0.1 mm Hg) and poured into a stainless steel mold. The polymer was cured at 100° C. for sixteen hours and demolded. The slab was then cooled to room temperature and the resistivities of the slab molded to a thickness of 0.25 in (0.635 cm) were measured as described above at the two designated relative humidities and the relative humidity sensitivity was determined after an equilibration time of fourteen days in a relative humidity chamber. The results are shown in Table I, Example 1 below.

EXAMPLE 2

This example describes the preparation of a crosslinked 40 Durometer Shore A hardness elastomeric polyurethane containing, as an additive blend of the present invention, a blend of a diethylene glycolferric chloride complex and bis[oxydiethylenebis(polycaprolactone)yl]- 5-methyltriphenylphosphoniumsulfo-1,3-benzenedicarboxylate at a molar ratio of diethylene glycol-ferric chloride complex to bis [oxydiethylenebis(polycaprolactone)yl]- 5-methyltriphenylphosphoniumsulfo-1,3-benzenedicarboxylate of 2:1. The molar ratio of ferric chloride to diethylene glycol in the complex was 1:3.

To a one-liter plastic beaker containing 12.80 g (142.15 meq) of a trimethylolpropane based polyfunctional polyol obtained from Dow Chemical Company as Vornol™, 0.96 g (1.25 meq) of bis[oxydiethylenebis(polycaprolactone)yl]-5-methyltriphenylphosphoniumsulfo-1,3-benzenedicarboxylate, 0.2 g (2.50 meq) of a complex of diethylene glycol and ferric chloride and two drops of a polydimethylsiloxane anti-foam agent obtained from Union Carbide Company as SAG 47™, were added 186.04 g (147.90 meq) of a polyester based polyurethane prepolymer obtained from Uniroyal Company as Vibrathane™ which analyzed as a toluene diisocyanate/adipate/polypropylene glycol prepolymer. The reaction mixture was stirred at room temperature, under nitrogen, for two minutes, degassed under reduced pressure (0.1 mm Hg) and poured into a stainless steel mold. The polymer was cured at 100° C. for sixteen hours and demolded. The slab was then cooled to room temperature and the resistivities of the slab molded to a thickness of 0.25 in (0.635 cm) were measured as described above at the two designated relative humidities and the relative humidity sensitivity was determined after an equilibration time of fourteen days in a relative humidity chamber. The results are shown in Table I, Example 2 below.

EXAMPLE 3

This example describes the preparation of a crosslinked 36 Durometer Shore A hardness elastomeric polyurethane containing, as an additive blend of the present invention, a blend of a diethylene glycol-ferric chloride complex and bis[oxydiethylenebis(polycaprolactone)yl]- 5-methyltriphenylphosphoniumsulfo-1,3-benzenedicarboxylate at a molar ratio of the diethylene glycol-ferric chloride complex to the bis[oxydiethylenebis(polycaprolactone)yl]- 5-methyltriphenylphosphoniumsulfo-1,3-benzenedicarboxylate of 1:2. The molar ratio of the ferric chloride and diethylene glycol in the complex was 1:3.

To a one-liter plastic beaker containing 12.30 g (138.50 meq) of a trimethylolpropane based polyfunctional polyol obtained from Dow Chemical Company as Vornol™, 3.85 g (5.00 meq) of bis[oxydiethylenebis(polycaprolactone)yl]-5-methyltriphenylphosphoniumsulfo-1,3-benzenedicarboxylate, 0.2 g (2.50 meq) of a complex of diethylene glycol and ferric chloride and two drops of a polydimethylsiloxane anti-foam agent obtained from Union Carbide Company as SAG 47™, were added 183.65 g (146.00 meq) of a polyester based polyurethane prepolymer obtained from Uniroyal Company as Vibrathane™ which analyzed as a toluene diisocyanate/adipate/polypropylene glycol prepolymer. The reaction mixture was stirred at room temperature, under nitrogen, for two minutes, degassed under reduced pressure (0.1 mm Hg) and poured into a stainless steel mold. The polymer was cured at 100° C. for sixteen hours and demolded. The slab was then cooled to room temperature and the resistivities of the slab molded to a thickness of 0.25 in (0.635 cm) were measured as described above at the two designated relative humidities and the relative humidity sensitivity was determined after an equilibration time of fourteen days in a relative humidity chamber. The results are shown in Table I, Example 3 below.

COMPARATIVE EXAMPLE 4

This example describes the preparation of a cross-linked 48 Durometor Shore A hardness elastomeric polyurethane outside the scope of the invention to compare the relative humidity sensitivity of the polyurethane elastomers of the present invention to the relative humidity sensitivity of the polyurethane materials of the prior art, specifically those described in U.S. Pat. No. 5,212,032 to Wilson et al. The example shows the preparation of a polyurethane elastomer containing, as a conductivity control agent, a ferric-chloride-diethylene glycol complex disclosed by Wilson et al in U.S. Pat. No. 5,212,032.

To a 500 ml resin kettle containing 98.63 g (0.098 mol) of Terathane 1000, a poly(tetramethylene glycol) available from E. I. DuPont de Nemours Company, (Mn=1,000) and 0.36 g ($7.5 \times 10^{-4}$ mol) ferric chloride-diethylene glycol complex conductivity control agent, there were added, with stirring, 65.79 g (0.25 mol) of 1,1'-methylenebis(4-isocyanatocyclohexane) obtained commercially from Mobay Corporation under the tradename Desmodur W. The stirred reaction mixture was heated to 80° C. under nitrogen for seventy minutes. Next, 98.63 g (0.098 mol) of poly(tetramethylene glycol) were added along with 4.0 g (0.0225 mol) of diethyltoluenediamine obtained commercially as Ethacure 100 from Ethyl Corporation. The reaction mixture was stirred under nitrogen at 80° C. for five minutes, degassed under reduced pressure and poured into a stainless steel mold. The polymer was cured in an 80° C. oven for sixteen hours. The slab was then removed from the oven, demolded, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I Example 4, below.

COMPARATIVE EXAMPLE 5

This example describes the preparation of a cross-linked 53 Durometer Shore A hardness elastomeric polyurethane outside the scope of the invention to compare the relative humidity sensitivity of the polyurethane elastomers of the present invention to the relative humidity sensitivity of the polyurethane materials of the prior art, specifically those described in U.S. Pat. Nos. 4,729,925 and 4,742,941 to Chen et al. The example shows the preparation of a polyurethane elastomer containing, as a conductivity or resistivity control agent, a conductivity control agent disclosed by Chen et al, namely bis[oxydiethylenebis(polycaprolactone)yl]- 5-methyltriphenylphosphoniumsulfo-1,3-benzenedicarboxylate.

To a glass kettle there were added 80.76 g of a polytetramethylene glycol/polypropylene glycol based resin end-capped with an excess of toluene diisocyanate, obtained from Dow Chemical Company, 18.0 g of bis[oxydiethylenebis(polycaprolactone)yl]- 5-methyltriphenylphosphoniumsulfo-1,3-benzenedicarboxylate, three drops of a polydimethylsiloxane anti-foam agent obtained from Union Carbide Company as SAG 47™, and 21.5 g of di(methylthio)-2,4-toluenediamine, an aromatic diamine sold by and obtained from Ethyl Corporation under the tradename Ethacure 300. The reaction mixture was stirred at room temperature, under nitrogen, for four minutes, degassed under reduced pressure (0.01 mm Hg) and poured into a stainless steel mold. The polymer was cured at 100° C. for sixteen hours and demolded. The slab was then cooled to room temperature and the resistiviities of the slab molded to a thickness of 0.25 in (0.635 cm) were measured as described above at the two designated relative humidities and the relative humidity sensitivity was determined after an equilibration time of fourteen days in a relative humidity chamber. The results are shown in Table I, Example 5 below.

TABLE I

Humidity Sensitivities of the Polyurethane Elastomers of Examples 1–5

| Examples | Resistivity at Designated Relative Humidity (ohm cm) | | Time (days) | RH Sensitivity |
| --- | --- | --- | --- | --- |
|  | 0% | 100% | 14 |  |
| Example 1 | $6.56 \times 10^8$ | $1.27 \times 10^8$ | 14 | 5.17 |
| Example 2 | $5.53 \times 10^8$ | $1.18 \times 10^8$ | 14 | 4.69 |
| Example 3 | $8.86 \times 10^8$ | $1.38 \times 10^8$ | 14 | 6.45 |
| Example 4 | $2.62 \times 10^9$ | $2.37 \times 10^9$ | 14 | 1.11 |
| Example 5 | $9.44 \times 10^9$ | $6.57 \times 10^8$ | 14 | 14.37 |

As shown in Table I, a comparison of the relative humidity sensitivity and resistivity of the polyurethane elastomer of Example 4 containing the ferric-chloride diethylene glycol conductivity control agent of Wilson et al disclosed in U.S. Pat. No. 5,212,032, and the relative humidity sensitivity and resistivity of the polyurethane elastomer of Example 5 containing the bis[oxydiethylenebis(polycaprolactone)yl]-5-methyltriphenylphosphoniumsulfo-1,3-benzenedicarboxylate conductivity control agent of Chen et al disclosed in U.S. Pat. Nos. 4,729,925 and 4,742,941 with the relative humidity sensitivities and resistivities of the polyurethane elastomers of Examples 1, 2 and 3 containing the conductivity control agents of the present invention, clearly shows improved relative humidity sensitivity relative to the conductivity control agents of Chen et al and excellent relative humidity sensitivity overall.

EXAMPLE 6

Electrical aging tests were carried out using the polyurethane materials of Examples 1 through 5 to show that the polyurethane elastomers of the present invention are superior to those of the prior art, specifically those described in U.S. Pat. No. 5,212,032 to Wilson et al and those described in U.S. Pat. Nos. 4,729,925 and 4,742,941 to Chen et al with respect to improved or extended electrical life.

The test consisted of placing samples two inches (5.08 cm) in width and two inches (5.08 cm) in length of the polyurethane materials of Examples 1–5 between two stainless steel electrodes having a cross sectional area of four square inches. A constant voltage of 2 kV DC was applied to one electrode and the other electrode was grounded through a precision load resistor. The value of the resistor used depended upon the initial resistivity of the test slab but was always at least one order of magnitude lower in impedance than the test slab. Current flow through the test slab was monitored via the voltage drop across the load resistor. This voltage drop was fed into a computer data acquisition system with a sample rate of 1 Hz for the first 120 seconds of current flow and 0.02 Hz (50 sec/datapoint) thereafter.

Aging of the slabs was conducted for three hours. Electrical aging of the samples was measured by dividing the final volume resistivity of the slabs by the initial volume resistivity of the slabs to determine the increase in volume resistivity over time between the initial volume resistivity and the final volume resistivity, the smallest increase in volume resistivity being representative of the slab possessing the longest electrical life.

The results are reported in Table II, below.

TABLE II

| Samples | Initial Volume Resistivity (ohm cm) | Final Volume Resistivity (ohm cm) | Final Volume Resistivity ÷ Initial Volume Resistivity |
| --- | --- | --- | --- |
| 1 | $3.80 \times 10^8$ | $9.50 \times 10^8$ | 2.50 |
| 2 | $3.80 \times 10^8$ | $10.25 \times 10^8$ | 2.70 |
| 3 | $2.25 \times 10^8$ | $3.80 \times 10^8$ | 1.69 |
| 4 | $50.00 \times 10^8$ | $340.00 \times 10^8$ | 6.80 |
| 5 | $4.80 \times 10^8$ | $13.50 \times 10^8$ | 2.81 |

As shown in Table II, the polyurethane materials of the present invention exhibit improved or extended electrical life as compared to the polyurethane materials of either Chen et al or Wilson et al.

Although Applicants have referred to the biasable member coating materials of the invention throughout as polyurethane materials, it is to be understood that in the strictest sense, when a polyamine is present in the hardening composition that the resultant elastomeric material is comprised of a polyurethane/polyurea elastomer.

The invention has been described in detail with particular reference to preferred embodiments thereof, but it will be understood that variations and modifications can be effected within the spirit and scope of the invention.

We claim:

1. An electrically conductive or semiconductive polymeric material comprising a polymeric material having incorporated therein to provide the polymeric material with a resistivity of from about $10^6$ to about $5.0 \times 10^{11}$ ohm cm, a blend of:

(i) a bis[oxydiethylenebis(polycaprolactone)yl]sulfoaryldicarboxylate or a bis[oxydiethylenebis(polycaprolactone)yl]sulfonamidosulfonylaryldicarboxylate, as represented by formula (I) or formula (II):

wherein
R¹ represents:

$$+O+CH_2)_5\overset{O}{\underset{\|}{C}}]_m OCH_2CH_2OCH_2CH_2O+C+CH_2)_5 O]_n H;$$

R⁶ represents sulfonate, oxyphenylene sulfonate, oxycyclohexylene sulfonate or p-toluenesulfonamidosulfonyl;

R² represents oxyphenylene sulfonate, oxycyclohexylene sulfonate, or p-toluenesulfonamidosulfonyl;

R⁷ represents:

$$+O-R^3-\overset{O}{\underset{\|}{C}}]_m OR^4-O+\overset{O}{\underset{\|}{C}}-R^3-O]_n H;$$

R³ represents a straight or branched chain alkylene group having 2 to 7 carbon atoms;

R⁴ is the same as R³ or is $-(R^5-O)_x R^5$;

R⁵ is the same as R³;

m and n in formula (I) are integers which together are of sufficient value to achieve an R¹ molecular weight of 300 to 30,000;

m and n in formula (II) are integers which together are of sufficient value to achieve an R⁷ molecular weight of 300 to 30,000; and M represents hydrogen, an alkali metal, ammonium or $P^+(C_6H^5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0.

2. An electrically conductive or semi-conductive polymeric material according to claim 1, wherein said polymeric material comprises from about 0.001 to about 5.0 weight percent, based on the total weight of said polymeric material, of said blend.

3. An electrically conductive or semi-conductive polymeric material according to claim 1, wherein said polymeric material is an elastomeric polymer.

4. An electrically conductive or semi-conductive polymeric material according to claim 3, wherein said elastomeric polymer is a polyurethane.

5. An electrically conductive or semi-conductive polymeric material according to claim 3, wherein said elastomeric polymer is a rubber.

6. An electrically conductive or semi-conductive polymeric material according to claim 5, wherein said rubber is selected from nitriles, natural rubbers, fluorocarbons and silicones.

7. An electrically conductive or semi-conductive polymeric material according to claim 1, wherein said polymeric material is a polyurethane foam.

8. An electrically conductive or semi-conductive polymeric material according to claim 1, wherein said polymeric material is an adhesive polymer.

9. An electrically conductive or semi-conductive polymeric material according to claim 1, wherein said polymeric material is a plastic.

10. An electrically conductive or semi-conductive polymeric material according to claim 1, wherein said polymeric material is a resilient, elastomeric polyurethane formed by reacting:

(A) a polyisocyanate prepolymer comprising the reaction of product of:
(a) a saturated aliphatic polyisocyanate, a saturated cycloaliphatic polyisocyante or an aromatic polyisocyanate; and
(b) a polyol free of aliphatic unsaturation; and
(B) a hardening mixture comprising:
(a) a polyol of (A)(b) or a diamine free of aliphatic unsaturation or a mixture thereof.

11. An electrically conductive or semi-conductive polymeric material according to claim 1, wherein said complex is a ferric chloridediethylene glycol complex and said dicarboxylate is bis[oxydiethylenebis(polycaprolactone)yl]-5-methyltriphenylphosphoniumsulfo-1,3-benzenedicarboxylate.

12. An electrically conductive or semi-conductive polymeric material according to claim 1, wherein said blend for controlling the resistivity of the polyurethane and for extending the electrical life thereof further substantially reduces the sensitivity of the resistivity of the polymeric material to changes in relative humidity.

13. A member for electrically cooperating with a conductive support surface to attract charged toner particles from the support surface towards the member which comprises a conductive substrate for supporting a uniform potential thereon and at least one coating which comprises a polymeric material having incorporated therein in an amount sufficient to provide the polymeric material with a resistivity of from about $10^6$ to about $5.0 \times 10^{11}$ ohm cm, a blend of:

(i) a bis[oxydiethylenebis(polycaprolactone)yl]sulfoaryldicarboxylate or a bis[oxydiethylenebis(polycaprolactone)yl] sulfoamidosulfonylaryldicarboxylate, as represented by formula (I) or formula (II):

(I)
$$R^1-\overset{O}{\underset{\|}{C}}-\underset{R^6-M^+}{\text{(benzene ring)}}-\overset{O}{\underset{\|}{C}}-R^1$$

(II)
$$R^7-\overset{O}{\underset{\|}{C}}-\underset{R^2-M^+}{\text{(benzene ring)}}-\overset{O}{\underset{\|}{C}}-R^7$$

wherein
¹ represents:

$$+O+CH_2)_5\overset{O}{\underset{\|}{C}}]_m OCH_2CH_2OCH_2CH_2O+C+CH_2)_5 O]_n H;$$

R⁶ represents sulfonate, oxyphenylene sulfonate, oxycyclohexylene sulfonate or p-toluenesulfonamidosulfonyl;

R² represents oxyphenylene sulfonate, oxycyclohexylene sulfonate, or p-toluenesulfonamidosulfonyl;

R⁷ represents:

$$+O-R^3-\overset{O}{\underset{\|}{C}}]_m OR^4-O+\overset{O}{\underset{\|}{C}}-R^3-O]_n H;$$

R³ represents a straight or branched chain alkylene group having 2 to 7 carbon atoms;

$R^4$ is the same as $R^3$ or is $-(R^5-O)_x R^5$ $R^5$ is the same as $R^3$;

m and n in formula (I) are integers which together are of sufficient value to achieve an $R^1$ molecular weight of 300 to 30,000;

m and n in formula (II) are integers which together are of sufficient value to achieve an $R^7$ molecular weight of 300 to 30,000; and M represents hydrogen, an alkali metal, ammonium or $P^+(C_6H_5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0, the coating being an electrical contact with the conductive substrate such that the coating is capable of transmitting a bias potential from the substrate to the outer periphery of the coating.

14. A member according to claim 13, wherein said polymeric material comprises from about 0.001 to about 5.0 percent, by weight, based on the total weight of said polymeric material, of said blend.

15. A member according to claim 13, wherein said polymeric material is an elastomeric polymer.

16. A member according to claim 15, wherein said polymeric material is a polyurethane.

17. A member according to claim 16, wherein said elastomeric polyurethane has a hardness of from about 10 Shore A to about 80 Shore D.

18. A member according to claim 16, wherein the conductive substrate having a coating of elastomeric polyurethane is formed of a conductive metal in the shape of an endless belt.

19. A member according to claim 16, wherein the conductive substrate having a coating of elastomeric polyurethane is formed of a conductive metal in the shape of a roll.

20. A member according to claim 16, wherein the polyurethane is formed by reacting:
(A) a polyisocyanate prepolymer comprising the reaction product of:
  (a) a saturated aliphatic polyisocyanate, a saturated cycloaliphatic polyisocyanate or an aromatic polyisocyanate; and
  (b) a polyol free of aliphatic unsaturative; and
(B) a hardening mixture comprising:
  (a) a polyol of (A)(b) or a diamine free of aliphatic unsaturation or a mixture thereof.

21. A member according to claim 20, wherein said complex is a complex of ferric chloride and diethylene glycol and said dicarboxylate is bis[oxydiethylenebis(polycaprolactone)yl]- 5-methyltriphenylphosphoniumsulfo-1,3-benzenedicarboxylate.

22. A member according to claim 20, wherein the conductive support surface comprises a photoconductor.

23. A method of making an electrically conductive or semi-conductive polymeric material having a resistivity of from about $10^6$ to about $5.0 \times 10^{11}$ ohm cm, the method comprising the steps of mixing a blend of:
(i) a bis[oxydiethylenebis(polycaprolactone)yl]sulfoaryldicarboxylate or a bis[oxydiethylenebis(polycaprolactone)yl] sulfoamidosulfonylaryldicarboxylate, as represented by formula (I) or formula (II):

wherein
$R^1$ represents:

$R^6$ represents sulfonate, oxyphenylene sulfonate, oxycyclohexylene sulfonate or p-toluenesulfonamidosulfonyl;

$R^2$ represents oxyphenylene sulfonate, oxycyclohexylene sulfonate, or p-toluenesulfonamidosulfonyl;

$R^7$ represents:

$R^3$ represents a straight or branched chain alkylene group having 2 to 7 carbon atoms;

$R^4$ is the same as $R^3$ or is $-(R^5-O)_x R^5$;

$R^5$ is the same as $R^3$;

m and n in formula (I) are integers which together are of sufficient value to achieve an $R^1$ molecular weight of 300 to 30,000;

m and n in formula (II) are integers which together are of sufficient value to achieve an $R^7$ molecular weight of 300 to 30,000; and M represents hydrogen, an alkali metal, ammonium or $P^+(C_6H_5)_3CH_3$, and (ii) a complex of a ferric halide selected from the group consisting of ferric fluoride, ferric chloride and ferric bromide and ethylene glycol or an oligoethylene glycol selected from the group consisting of di-, tri-, and tetraethylene glycol in a molar ratio of a dicarboxylate of formula (I) or formula (II) to complex of from 1.0:5.0 to 5.0:1.0 with a polymer or a polymer precursor to provide a solution that includes said blend and said polymer or polymer precursor; curing the solution to provide a polymeric material or a polymeric material produced from said polymer precursor having incorporated therein said blend of said dicarboxylate and said ferric halide salt complex; the quantity of said blend relative to said polymer or said polymer precursor being chosen so that the resistivity of the resultant polymeric material is from about $10^6$ to about $5.0 \times 10^{11}$ ohm cm.

24. A method according to claim 23, wherein said polymeric material comprises from about 0.01 to about 5.0 percent by weight, based on the total weight of the polymeric material, of said blend.

25. A method according to claim 23, wherein said polymer precursor is an isocyanate-functional prepolymer.

26. A method according to claim 23, wherein said polymeric material is an elastomeric polymer.

27. A method according to claim 26, wherein said elastomeric polymer is a polyurethane or a rubber.

28. A method according to claim 27, wherein said elastomeric polyurethane is formed by reacting:

(A) a polyisocyanate prepolymer comprising the reaction product of:
  (a) a saturated aliphatic polyisocyanate, a saturated cycloaliphatic polyisocyante or an aromatic polyisocyanate; and
  (b) a polyol free of aliphatic unsaturation; and (B) a hardening mixture comprising:
  (a) a polyol of (A)(b) or a diamine free of aliphatic unsaturation or a mixture thereof.

29. A method according to claim 27, wherein the resistivity of the elastomeric polyurethane is from about $2.0 \times 10^8$ to about $2.0 \times 10^{10}$ ohm cm.

30. A method according to claim 23, wherein said complex is a complex of ferric chloride and diethylene glycol and said dicarboxylate is bis[oxydiethylenebis(polycaprolactone)yl]- 5-methyltriphenylphosphoniumsulfo-1,3-benzenedicarboxylate.

* * * * *